Dec. 19, 1961 L. C. ANDERSON 3,013,476
LID LEVELER FOR CHADLESS TAPE
Filed Sept. 22, 1958

INVENTOR
LOUIS C. ANDERSON
BY R.C. Terry
ATTORNEY

United States Patent Office 3,013,476

Patented Dec. 19, 1961

3,013,476

LID LEVELER FOR CHADLESS TAPE

Louis C. Anderson, Melrose Park, Ill., assignor to Teletype Corporation, Chicago, Ill., a corporation of Delaware Filed Sept. 22, 1958, Ser. No. 762,314
4 Claims. (Cl. 93—1)

This invention relates to methods of and apparatus for lessening the effective thickness of a web of material having integral appendages punched from said web and extending laterally therefrom.

Heretofore, in the storage of chadless perforated tape, which is a species of perforated tape having apertures with hinged lids instead of perforations which are completely cut out (such as produced by the apparatus disclosed in United States Patent No. 2,255,794, granted September 16, 1941 to R. A. Lake), the means for winding and storing the chadless tape on a tape take-up reel was not conducive to the economical use of tape storage space, due to the fact that, after a tape sensing or reading operation, no facilities were available to level the hinged lids into the plane of the tape. With the arrangement according to the present invention, a novel means is provided for increasing the capacity of the tape take-up reel of a tape winder, which comprises facilities for leveling the lids of a perforated chadless tape substantially into the plane of the tape. The facilities for achieving the leveling process comprises means for imparting to said lids a bending stress to cause said lids to spring back into the plane of the perforated tape or strip.

The principal object of the invention is to provide facilities for increasing the storage possibilities of tape having lidded apertures.

Another object of the invention is to provide lid leveling instrumentalities to render the printing on tape having lidded apertures more readily readable.

A more complete understanding of the present invention may be had from the following description taken in conjunction with the accompanying drawings, wherein.

Figures 1, 2, 3, 4, 5:
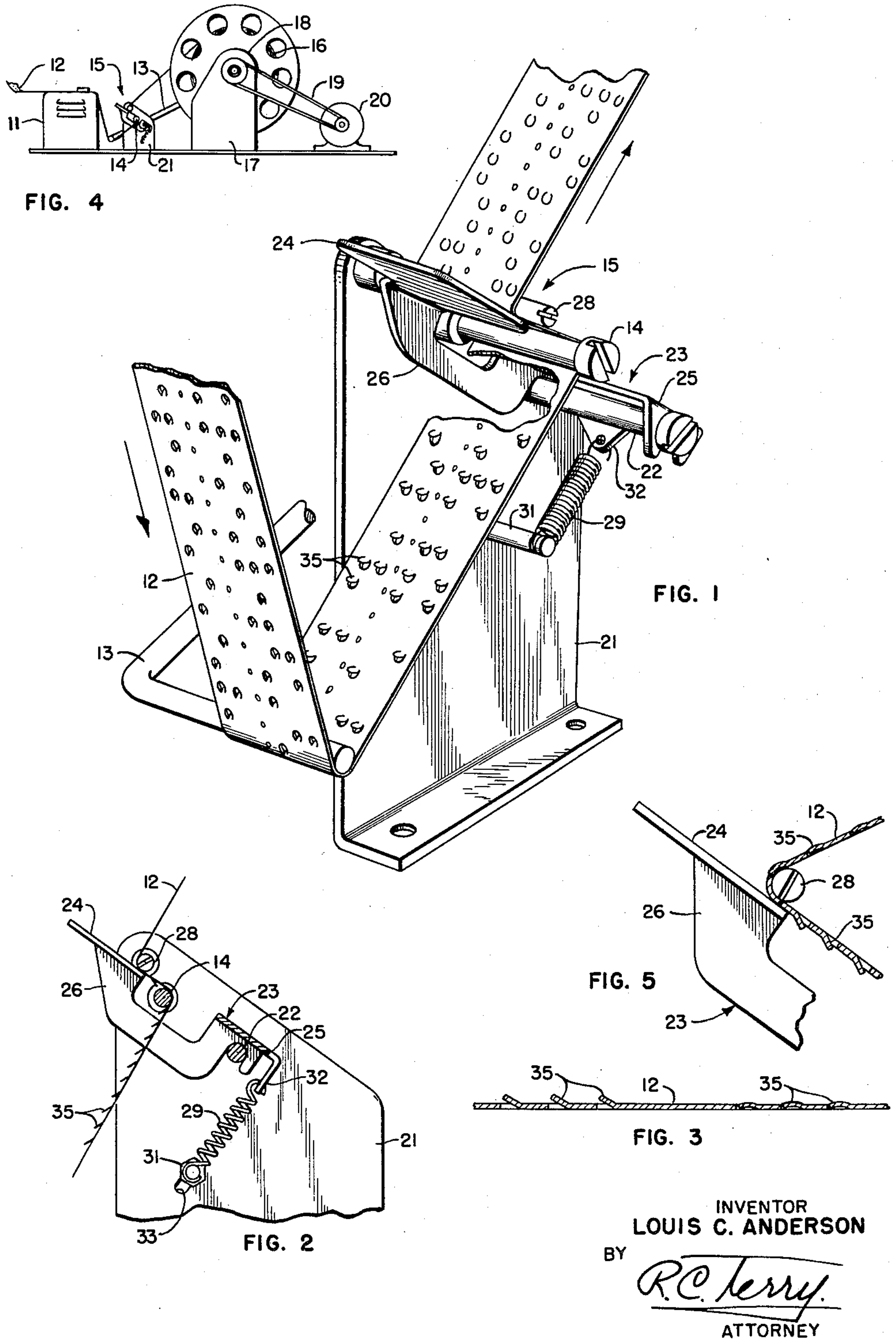
FIG. 1 is a perspective view of the lid leveling device according to the present invention.
FIG. 2 is an elevational view of the lid leveling arrangement shown in FIG. 1.
FIG. 3 is an enlarged longitudinal sectional view of a strip of tape showing the lids before and after the leveling operation.
FIG. 4 is a schematic diagram of a system utilizing the invention.
FIG. 5 is an enlarged fragmental cross-sectional view of the lid leveling facilities according to the invention.

Referring to FIG. 4, a tape transmitter 11 of any well known type (such as that shown in United States Patent No. 2,296,845, granted September 29, 1942, to M. T. Goetz) ejects the tape 12 having lidded apertures, which tape passes around a taut tape switch arm 13 of well known design, and thence around a tape guide stud 14, then through the lid leveling facilities 15 of the present invention, from which the tape is wound on the tape take-up reel 16 of a tape winder 17 to which a continuous torque is applied through a friction clutch 18 by means of a belt 19 driven by a motor 20.

Having reference to FIGS. 1 and 2, there is mounted on bracket 21, a stud 22 on which is pivotally mounted a pressure member 23. As shown in FIG. 1, the pressure member 23 is provided with a pressure plate portion 24 having a width substantially equivalent to the width of the tape 12. To afford a stable support on stud 22, the bearing portion 25 of member 23 is of substantially U-shaped construction to provide a double bearing on said stud. Integral with the inner flange of bearing portion 25 is a rib portion 26 which provides a support for the pressure plate portion 24. Rib portion 26 is offset, as shown in FIGS. 1 and 2, to clear the tape guide stud 14 mounted in the bracket 21.

As shown in FIG. 2, the stud 14 mounted in bracket 21 is so positioned that its peripheral surface is on a line substantially tangential with the peripheral surface of a tape guide stud 28 disposed on the opposite side of the tape 12, when said tape is threaded around said stud 14 and 28 in the manner shown in FIG. 2. The pressure plate portion 24 is urged against the stud 28 by a contractile spring 29 stretched between an anchor stud 31 mounted on the bracket 21 and an anchor portion 32 depending from member 23 so as to impart clockwise motion (as viewed in FIGS. 1 and 2) to the member 23. The force of spring 29 is rendered adjustable by virtue of the stud 31 being clamped adjustably to bracket 21 because of slot 33.

In the operation of the device according to the present invention, the tape 12 having the lidded apertures therein is sensed or read by the tape transmitter 11, and as a result thereof, the lids 35, pursuant to the tape sensing operation, have been urged upwardly by the tape sensing pins (not shown) in well known manner, whereafter the lids 35 assume the position substantially as illustrated at the left side of FIG. 3, wherein the resilience in the tape material comprising the lids is not sufficient to spring the lids back into the plane of the tape 12.

In practicing the invention, the tape 12 is directed around the taut tape switch arm 13 (FIG. 1), and is then threaded through the lid leveling facilities, indicated generally as 15. Merely passing the tape 12 around the arm 13 and/or stud 14 has been found to be insufficient to cause the lids 35 to assume a position in the plane of the tape 12. However, in passing the tape 12 around the stud 28, and between the stud 28 and the pressure plate 24 with the lids 35 facing the pressure plate 24, a curling or crimping effect is imparted to said tape lids 35 whereby a bending stress or action is produced therein to cause said lids 35 to spring back, or level themselves, substantially into the plane of the tape 12. With this arrangement, a means is provided for processing perforated tape having lidded apertures in such a manner as to increase the storage capacity of the tape take-up reel 16.

What is claimed is:

1. In a device for restoring into the body of a web integral appendages punched from said body, means for imparting longitudinal movement to the web, a cylindrical member against the surface of which the web is drawn, a spring-loaded flat pressure plate pressing the web into engagement with the cylindrical member and pressing the appendages into the apertures from which they were punched, and a guide member positioned to cause the web to travel in the plane of the pressure plate in its approach to the cylindrical member.

2. In combination in a lid leveling arrangement for tape having lidded apertures formed therein with the lids extending outwardly of the plane of the tape, a cylindrical stud, a spring loaded flat pressure plate having a tape engaging surface tangential to said stud, said tape passing between said cylindrical stud and the tape engaging surface of said pressure plate, tape take-up means for withdrawing said tape from between the stud and the flat pressure plate at an angle of approximately 90° with respect to the tape engaging surface of the pressure plate, and means for operating said tape take-up means.

3. In combination in a lid leveling arrangement for tape having lidded apertures formed therein with the lids extending outwardly of the plane of the tape, a cylindrical stud having a radius substantially equal in length to the diameter of said lidded apertures and being partially encircled by said tape, a spring, a flat pressure plate urged by said spring into a line contact with the portion of said tape partially encircling said stud, tape take-up means for withdrawing said tape from between the stud and the pressure plate at an angle of approximately 90° with respect to the pressure plate, and means for operating said tape take-up means.

4. In combination in a lid leveling arrangement for tape having lidded apertures formed therein with the lids extending outwardly from the plane of the tape, a cylindrical stud having a radius substantially equal in length to the diameter of said lidded apertures and being partially encircled by said tape, a spring, a flat pressure plate urged by said spring into engagement with the portion of said tape partially encircling said stud at a line of contact axially of the stud at its periphery, tape take-up means for withdrawing said tape from between said stud and said flat plate in a direction so as to return said lids into the plane of said tape and at an angle of approximately 90° with respect to the pressure plate so as to impart a curling effect to said lids to cause said lids to remain in the plane of said tape and thereby increase the storage capacity of said tape take-up means, means for operating said tape take-up means, and a guide member positioned to cause said tape to travel in the plane of said pressure plate in the approach of said tape to said cylindrical stud.

References Cited in the file of this patent

UNITED STATES PATENTS

| | | |
|---|---|---|
| 2,358,411 | May | Sept. 19, 1944 |
| 2,660,380 | Blackman et al. | Nov. 24, 1953 |
| 2,838,250 | Stavrakis et al. | June 10, 1958 |